United States Patent [19]

Schmidt

[11] Patent Number: 5,420,781
[45] Date of Patent: May 30, 1995

[54] HIGH VOLTAGE SENSING CIRCUIT FOR AN X-RAY TUBE POWER SUPPLY

[75] Inventor: Jonathan R. Schmidt, Wales

[73] Assignee: General Electric Company, Milwaukee, Wis.

[21] Appl. No.: 116,148

[22] Filed: Sep. 2, 1993

[51] Int. Cl.⁶ ............................................... H02M 7/44
[52] U.S. Cl. ........................................ 363/98; 363/17; 363/132
[58] Field of Search ................ 363/95, 96, 98, 131, 363/132, 136, 16, 17, 71; 378/112, 114

[56] References Cited

U.S. PATENT DOCUMENTS

| | | | |
|---|---|---|---|
| 4,421,993 | 12/1983 | Bloomer | 307/126 |
| 4,460,949 | 7/1984 | Steigerwald | 363/28 |
| 4,477,868 | 10/1984 | Steigerwald | 363/28 |
| 4,504,895 | 3/1985 | Steigerwald | 363/17 |
| 4,504,908 | 3/1985 | Riederer et al. | 364/414 |
| 4,541,041 | 9/1985 | Park et al. | 363/41 |
| 4,823,250 | 4/1989 | Kolecki et al. | 363/71 |
| 5,272,618 | 12/1993 | Blake | 363/79 |

Primary Examiner—Thomas M. Dougherty
Assistant Examiner—Adolf Berhane
Attorney, Agent, or Firm—Quarles & Brady

[57] ABSTRACT

A system senses a voltage that exists across two nodes using first and second resistors connected in series between the two nodes. A differential amplifier acts as a detector and produces a first signal having a magnitude that corresponds to the voltage across the second resistor. A variable gain circuit changes the magnitude of the first signal by a gain factor to produce a second signal which indicates the voltage that exists across two nodes. A mechanism coupled to said variable gain circuit and adjusts the gain factor to compensate for changes in resistivity of said first and second resistors. The mechanism determines the resistor gain provided by the first and second resistors and uses the resistor gain to derive a new value for the gain factor.

8 Claims, 3 Drawing Sheets

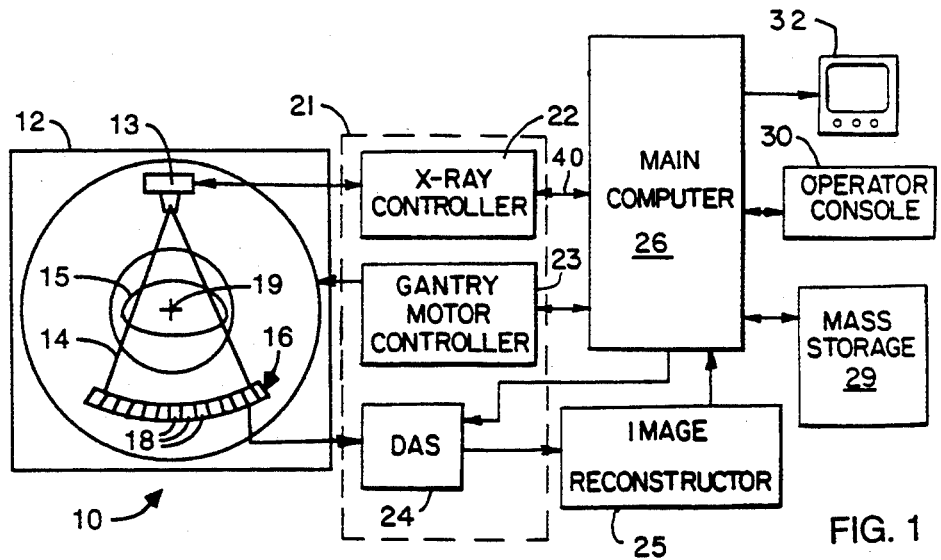
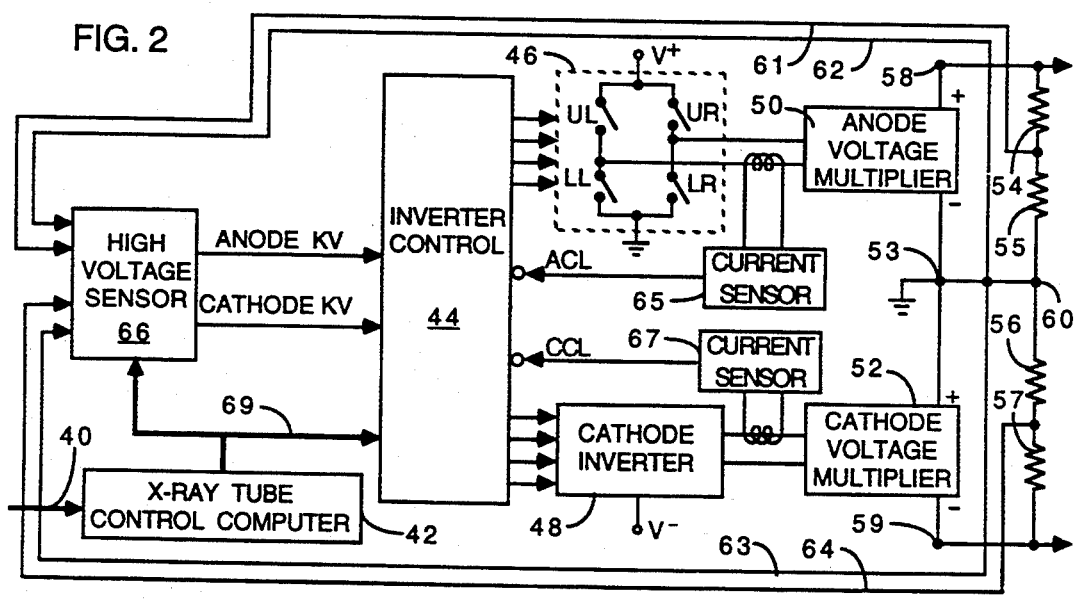

HIGH VOLTAGE SENSING CIRCUIT FOR AN X-RAY TUBE POWER SUPPLY

BACKGROUND OF THE INVENTION

The present invention relates to high voltage power supplies used in X-ray imaging equipment, and more particularly to circuitry for controlling an inverter used in such power supplies.

X-ray systems, such as computed tomography (CT) imaging apparatus frequently incorporate means to sense the high voltage applied to the X-ray tube. An accurate indication of the high voltage is required to regulate the power supply and accurately control X-ray imaging quality. For that purpose, special high voltage resistors form a voltage divider in the power supply to provide a low voltage feedback signal which is proportional to the high voltage produced by the power supply. Unfortunately, the high voltage resistors are subject to long term degradation due to environmental factors such as high electrical field stress, carbon tracking and treeing, corona discharges and transient events, such as tube spits. This degradation manifests itself as a change in the resistance with time. In addition to manufacturing tolerances, these aging effects introduce gain errors into the high voltage portion of the feedback system, which require periodic adjustment of the feedback circuitry to maintain the X-ray imaging system in calibration.

To accommodate adjustment for these gain errors, a variable resistor previously had been incorporated in the low voltage portion of the feedback circuit to adjust for variations in the high voltage components. The adjustment of the variable resistor involved an iterative manual calibration procedure, which depending upon the experience and skill of the service technician, often was quite time consuming. In addition, the presence of the variable resistor in the circuit created another serviceability problem. Since the gain of the low voltage control system was intentionally altered to accommodate the gain errors in the high voltage sensor, the transfer function of the low voltage section was not precisely known. Therefore, failure in either the high voltage or the low voltage sections often was difficult to detect and isolate. In the case of a closed-loop control system, the lack of failure detection can have catastrophic results. At a minimum, difficulty in isolating the failure can cause field repair to be very time consuming and expensive.

SUMMARY OF THE INVENTION

A system for sensing a voltage that exists across two nodes has first and second resistors connected in series between the two nodes. For example, the two nodes may be at the output of the high voltage supply for an X-ray tube. A detector has inputs connected across the second resistor and produces a first signal having a magnitude that corresponds to the voltage across the second resistor. A variable gain circuit changes the magnitude of the first signal by a gain factor to produce a second signal indicative of the voltage that exists between the two nodes.

A mechanism is coupled to the variable gain circuit and adjusts the gain factor to compensate for changes in resistivities of the first and second resistors.=In the preferred embodiment the mechanism comprises a means for determining the resistor gain of said first and second resistor; and a means for deriving a new value for the gain factor in response to the resistor gain provided by said means for determining.

An object of the present invention is to provide a system by which the gain of a voltage sensor can be altered to compensate for degradation of voltage sensing components, such as resistors of a voltage divider.

Another object is to provide an apparatus to calibrate the signal processing circuitry of the system independently of the high voltage sensing components.

A further object of the present invention is to provide a mechanism for deriving a resistor voltage gain which then can be employed to establish a value for the gain factor which compensates for a change in resistance of the sensing resistor.

BRIEF DESCRIPTION OF THE DRAWINGS

FIG. 1 is a block schematic diagram of a CT imaging apparatus;

FIG. 2 is a block diagram of the X-ray controller in FIG. 1;

DESCRIPTION OF THE PRESENT INVENTION

Figure 3:
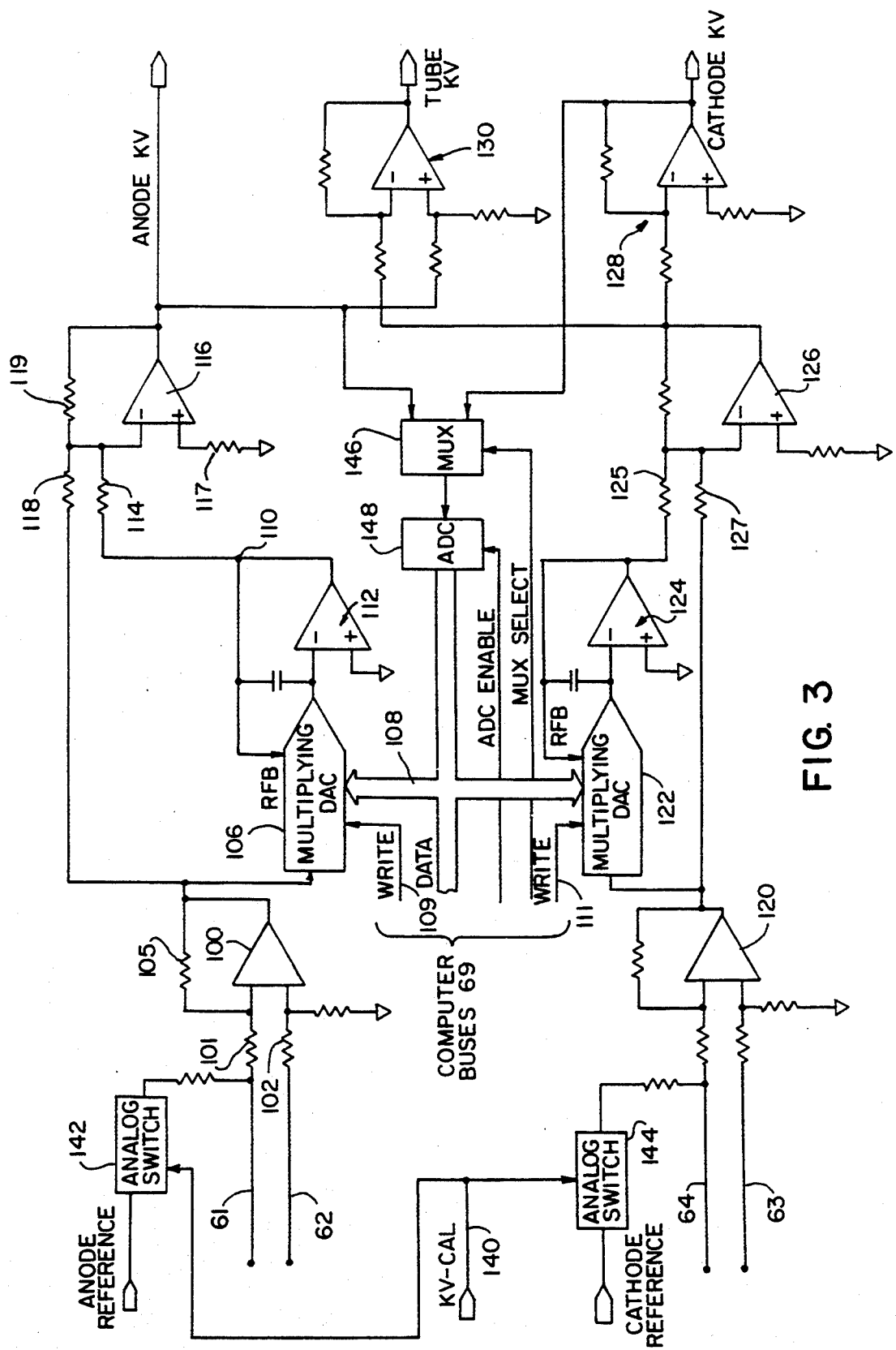
FIG. 3 is a schematic diagram of the high voltage sensor circuit of the X-ray controller.

With initial reference to FIG. 1, a computed tomography (CT) imaging system 10 includes a gantry 12 having an X-ray source 13 that projects a fan beam of X-rays 14. The fan beam of X-rays 14 passes through a patient 15 being imaged and impinges upon an X-ray detector 16. The detector is an array of a plurality of detector elements 18, which together detect a projected image resulting from the transmission of X-rays through the patient 15. The gantry 12 and the components mounted thereon rotate about a center of rotation 19 to obtain a number of views of the patient.

A control mechanism of the CT system 10 has gantry associated control modules 21, which include an X-ray controller 22 that regulates the power applied to the X-ray source 13, a gantry motor controller 23 that controls the rotational speed and position of the gantry 12, and a data acquisition system (DAS) 24 that samples projection data from the detector elements 18 and converts the data into digital words for later computer processing.

The output of the DAS 24 is connected to an image processor 25 which receives sampled and digitized projection data from the DAS and performs image reconstruction according to methods known in the art. The reconstructed image is applied as an input to a main computer 26, which stores the image in a mass storage device 29.

The X-ray controller 22 and gantry motor controller 23 are connected to receive control signals from main computer 26. The main computer 26 produces the appropriate control signals in response to parameters for the scan which an X-ray technician enters via the keyboard of an operator console 30 that is connected to the computer. The reconstructed image and other performance information are displayed by the main computer on an operator monitor 32. The mass storage device 29 also stores programs for operating and calibrating the CT imaging system.

FIG. 2 depicts the details of high voltage supply of the X-ray controller 22 with the understanding that the controller also includes a conventional filament supply (not shown). Control signals from the main computer 26 are carried by a set of signal buses 40 to an X-ray tube control computer 42 within the X-ray controller 22. At the outset of an exposure, these signals define the levels of high voltage and current to be applied to the X-ray tube 13. The X-ray tube control computer 42 responds by sending commands to the inverter control 44 that cause the latter device to produce a set of control signals for an anode inverter 46 and a cathode inverter 48. The two inverters 46 and 48 have identical construction with the details being shown for the anode inverter 46. The anode inverter 46 has a conventional H bridge design with four switches designated UL, UR, LL and LR. Four output signals from the inverter control 44 operate these four switches in a fashion that generates an alternating output voltage that is applied to a voltage multiplier 50. Specifically, UL and LR are closed simultaneously to apply one polarity of voltage to the voltage multiplier 50 while the switches LL and UR of the inverter 46 are open. Then, switches UL and LR are opened and switches UR and LL are closed to apply the opposite voltage polarity to voltage multiplier 50. This alternate switching of the four switches within the anode inverter 46 occurs in a rapid cyclical sequence to produce an alternating voltage which is applied to the input of the voltage multiplier 50. A similar set of switches is included in the cathode inverter 48 and are operated in a similar manner to produce an alternating voltage at the input of the cathode voltage multiplier 52.

The frequency and duty cycle at which the switches in each inverter 46 and 48 are operated determine the input voltage level applied to the two voltage multipliers 50 and 52. Each of the voltage multipliers increases the input voltage by a fixed gain to produce an even higher voltage at their output terminals. The negative output terminal of the anode voltage multiplier 50 is connected to the positive output terminal of the cathode voltage multiplier 52 at node 53 which is connected to the imaging system ground. The positive output terminal 58 of the anode voltage multiplier 50 is connected to the anode of the X-ray tube 13 and the negative output terminal 59 of the cathode voltage multiplier 52 is connected to the cathode of the X-ray tube.

Four resistors 54, 55, 56 and 57 are connected in series between the positive output terminal 58 of the anode voltage multiplier 50 and the negative output terminal 59 of the cathode voltage multiplier 52. A central node 60 of the series connection of the resistors 54-57 is connected to ground. As a result of this connection, resistors 54 and 55 form a voltage divider across which is applied the output voltage from the anode voltage multiplier 50. The values of these resistors 54 and 55 are such that the voltage across resistor 55 is a relatively low level which is proportional to the output of the anode voltage multiplier 50 and which is compatible with the digital control circuit in the X-ray controller 22. Similarly, resistors 56 and 57 form a voltage divider for the output voltage of the cathode voltage multiplier 52. The values of these resistors are such that the voltage across resistor 56 is a relatively low level that is proportional to the output of the voltage multiplier 52.

Anode voltage sensing lines 61 and 62 connect opposite ends of resistor 55 to inputs of a high voltage sensor circuit 66. Similarly, cathode voltage sensing lines 63 and 64 couple opposite ends of resistor 56 to another input of the high voltage sensor circuit 66. The high voltage sensor circuit 66 produces a voltage signal designated ANODE KV which is proportional to the anode voltage produced by voltage multiplier 50. Similarly, the high voltage sensor circuit 66 produces an output voltage level designated CATHODE KV which is proportional to the cathode voltage produced by voltage multiplier 52. Both of the signals, ANODE KV and CATHODE KV are applied as inputs to the inverter control circuit 44. As will be described, the inverter control circuit 44 compares the desired anode to cathode voltage for the X-ray exposure to the actual anode and cathode voltages represented by the ANODE KV and CATHODE KV signals. The operation of the inverters 46 and 48 is regulated in response to this comparison so that the X-ray tube 13 is excited with the desired anode-cathode high voltage.

As described previously the voltage sensing resistors 54-57 degrade over time changing the characteristics of the voltage dividers. Therefore, the high voltage sensor circuit 66 must provide a mechanism that compensates for that degradation so that the ANODE KV and CATHODE KV signals accurately represent the actual anode and cathode voltages. Referring to FIG. 3, lines 61 and 62 from the anode voltage sensing resistor 55 are coupled to inputs of a first differential amplifier 100 by resistors 101-102. The first differential amplifier 100 acts as a detector producing a signal at its output that indicates the voltage across resistor 55 and ideally indicates the high voltage output of anode voltage multiplier 50.

The output of the first differential amplifier 100 is connected to its inverting input by a feedback resistor 105. The output of the first differential amplifier 100 is connected to the analog reference input of an eight-bit, first multiplying digital-to-analog converter (DAC) 106, such as Model AD7528 manufactured by Analog Devices, Inc. The first multiplying DAC 106 acts as a variable gain device that adjusts the sensed voltage signal to provide approximately a ±20 percent correction range. The desired nominal gain is achieved at midrange of the gain factors, i.e. by a gain factor of 128 at which the DAC provides unity gain. For a 100 kV X-ray tube excitation voltage, a 0.25 percent correction change occurs for each increment of the gain factor. The data inputs of the first multiplying DAC 106 are connected to a data bus 108 from the X-ray tube control computer 42 to receive a gain factor by which the analog input will be multiplied. When the first multiplying DAC 106 is enabled by a write signal on line 109 from computer 42, the gain factor received on data bus 108 is stored within the first multiplying DAC 106. The process by which the computer 42 determines the gain factor will be described subsequently. The output of the first multiplying DAC 106 is connected to the inverting input of a first current-to-voltage converter 112. The output voltage of the current-to-voltage converter 112 at node 110 is proportional to the output of differential amplifier 100 by the gain factor. Node 110 is connected to the feedback resistor input (RFB) of the first multiplying DAC 106.

The output of the current-to-voltage converter 112 is coupled by a resistor 114 to the inverting input of a first output amplifier 116 which has its non-inverting input coupled to ground by resistor 117. The inverting input of the first output amplifier 116 also receives the output of the first differential amplifier 100 through a coupling resistor 118. The first output amplifier 116 produces a signal designated ANODE KV and represents the true anode voltage and forms one output of the high voltage sensor circuit 66. The ANODE KV signal is fed back via resistor 119 to the inverting input of the first output amplifier 116.

A similar circuit exists for sensing the cathode voltage. In this circuit shown in the lower portion of FIG. 3, lines 63 and 64 from the cathode voltage sensing resistor 57 are coupled to a second differential amplifier 120. The second differential amplifier 120 is connected to a second multiplying DAC 122 which receives a gain factor from the X-ray tube control computer 42 via data bus 108 when a second write enable line 111 is active. The second multiplying DAC 122 is identical to the first multiplying DAC 106. The output from the second multiplying DAC is connected to the inverting input of a second current-to-voltage converter 124 which produces an output that is coupled via resistor 125 to the inverting input of a second output amplifier 126. The output from the second differential amplifier 120 is coupled via resistor 127 to the inverting input of the second output amplifier 126. Since the voltage on the cathode of the X-ray tube 13 will be negative with respect to ground, so too will be the low voltage signal produced by the second output amplifier 126 which corresponds to the cathode voltage. As a consequence, the output of the second output amplifier 126 is inverted by an inverter 128 to produce a signal designated CATHODE KV which represents the actual cathode voltage.

The output signals from the first and second output amplifier 116 and 126 are combined in a summing amplifier 130 to produce an output signal, designated TUBE KV, which represents the actual anode-to-cathode potential of the X-ray tube 13.

Figure 4:
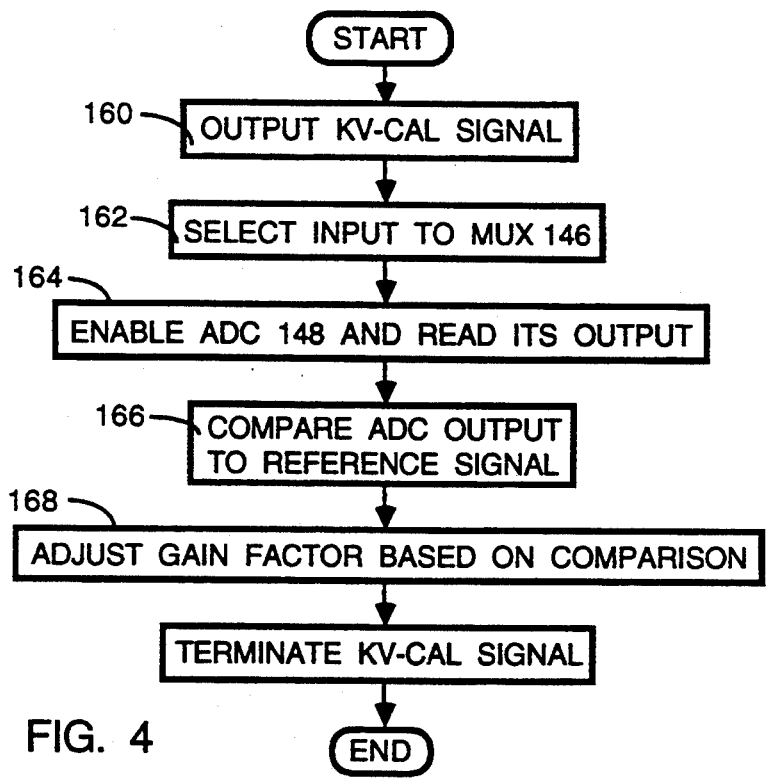
FIG. 4 is a flowchart of a process for calibrating low voltage components of the X-ray controller.

In order for the high voltage sensor circuit 66 to accurately indicate the respective voltages, the circuit first must be calibrated. To do so, a service technician enters the appropriate command into the operator console 30 which is conveyed to the X-ray tube control computer 42 via buses 40. With reference to FIG. 4, this command causes computer 42 to issue a calibration signal designated KV-CAL on line 140 at step 160. Line 140 extends to the control inputs of two analog switches 142 and 144. The first analog switch 142 applies an anode reference signal to line 61 and thus to an input of the first differential amplifier 100. Similarly, the second analog switch 144 applies a cathode reference signal to line 64, which is coupled to an input of the second differential amplifier 120. At this time, the X-ray tube 13 is not being excited and high voltage is not being applied across the sensing resistors 54–57. Therefore, only the reference signals are being applied via switches 142 and 144 to the anode and cathode voltage measurement circuits. The corresponding reference signal are amplified by the respective differential amplifiers 100 and 120 and multiplied in the two multiplying DAC's 106 and 122. The output currents from multiplying DAC's 106 and 122 are converted to voltage level signals by devices 112 and 124 and applied to the inputs of the corresponding output amplifiers 116 and 126.

The ANODE KV and the CATHODE KV signals produced from the reference signals are applied to inputs of a multiplexer (MUX) 146. In response to a signal designated MUX SELECT from the X-ray tube control computer 42, the multiplexer 146 applies one of its input signals an analog-to-digital converter (ADC) 148 at step 162. When the ADC 148 is enabled by an ADC EN-ABLE signal from computer 42, the digitized signal from the multiplexer 146 is applied to the data bus 108 and read by computer 42 at step 164.

The digitized value applied to the data bus 108 should numerically correspond to the reference signal for either the cathode or the anode depending upon which output signal from the sensor circuit 66 has been selected by multiplexer 146. If the sensor circuit 66 is operating properly, the digitized value should represent the reference signal exactly. Any deviation in the digital value from the value which corresponds to the reference signal indicates an error in the corresponding portion of the sensor circuit, which error is detected by a comparison of the signals at step 166. In response to such an error, the X-ray tube control computer 42 at step 168 adjusts the gain factor for the first or second multiplying DAC 106 or 122, which is associated with the malfunctioning portion of the circuit. This new gain factor is stored within the appropriate multiplying DAC and a new sample of the measured reference signal is obtained from ADC 148. This process cycles automatically until the value from the ADC 148 corresponds precisely to the corresponding reference signal applied via analog switch 142 or 144. The process is repeated for both the cathode and the anode portion of the measurement circuit.

Figure 5:
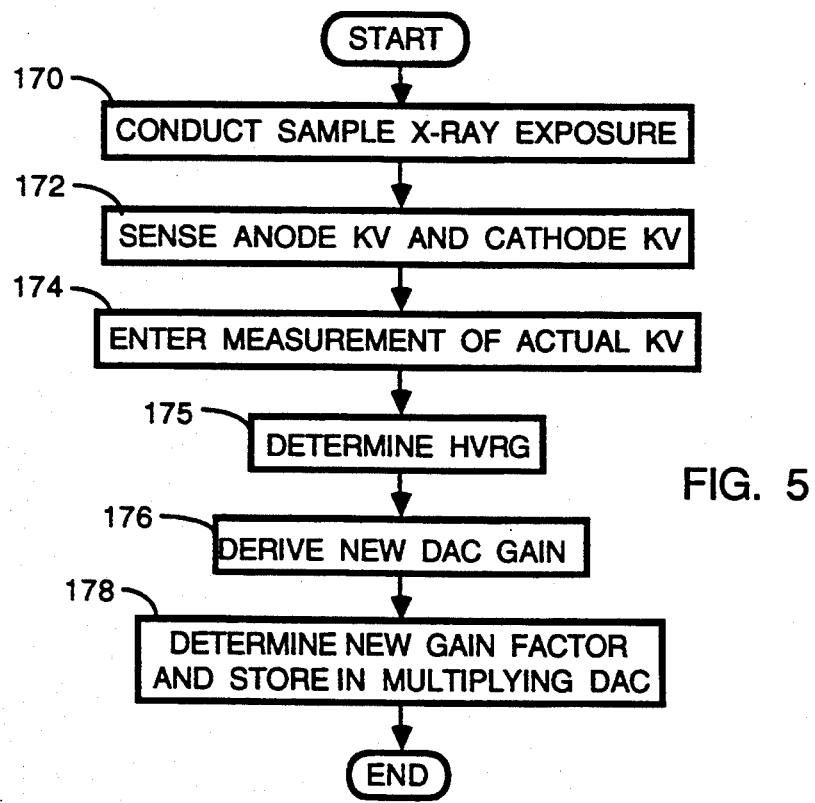
FIG. 5 is a flowchart of a process for calibrating the X-ray controller for variations in high voltage resistors.

Referring to FIG. 5, once the low voltage components of the X-ray controller 22 have been calibrated, a sample exposure is conducted to calibrate for variations of high voltage resistors 54 and 57. The calibration the anode portion of the high voltage sensor circuit 66 need only be described since the cathode portion is calibrated in the same manner. The service technician commences this calibration phase by entering an appropriate command into the operator console 30. A test exposure then is conducted at a predefined anode-to-cathode voltage level, i.e. a predefined level of ANODE KV at step 170. During the exposure, the service technician measures actual anode voltage (ACTUAL KV) using a conventional piece of external test equipment. The measured anode voltage is entered into the main computer 26 through the operator console 30 at step 174.

The feedback equations for the high voltage sensor 66 described above are defined as:

$$\text{INPUT KV} = \text{ACTUAL KV} \times \text{HVRG} \quad (b\,1)$$

$$\text{ANODE KV} = 1.2 \times \text{INPUT KV} \times (1 - (\text{DAC GAIN}/3)) \quad (2)$$

where INPUT KV is the voltage across resistor 55 that is applied as the input to the sensor 66, HVRG is the high voltage resistor gain, and the DAC GAIN is the multiplying DAC gain factor divided by 256, which is the maximum factor for an eight-bit multiplying DAC. Equation (2) is defined for the present system in which the multiplying DAC 106 provides unity gain a mid range of the gain factors. The values of resistors 114, 118 and 119 determine the overall range of adjustment and the constants of equation (2).

From the above equations the value of the high voltage resistor gain is given by:

$$\text{HVRG} = \text{ANODE KV}/[\text{ACTUAL KV} \times 1.2 \times (1 - (\text{DAC GAIN}/3))] \quad (3)$$

The X-ray tube control computer 42 receives the value of ACTUAL KV that the service technician entered into the operator console 30 at step 174 and receives a value for ANODE KV by enabling multiplexer 146 and analog-to-digital converter 148 at step 172. The computer 42 already knows a value for DAC GAIN from the gain factor previously programmed into the DAC 106. Thus the X-ray tube control computer 42 is able to determine the high voltage resistor gain at step 175.

Once the high voltage resistor gain is known, a new DAC gain that will result in the value of ANODE KV equaling the value of ACTUAL KV can be derived by computer 42 at step 176 using the expression:

$$NEW\ DAC\ GAIN = 3 - (2.5/HVRG)$$

From the NEW DAC GAIN, the X-ray tube control computer 42 computes the corresponding gain factor which then is stored into the multiplying digital-to-analog converter 106 at step 178.

The above process enables the computer 42 to quickly calibrate the desired operating point for the multiplying digital-to-analog converter 106 without the time-consuming manual process utilized previously when variable resistors were employed to compensate for deviation of the high voltage resistor gain.

Ideally, the high voltage resistor gain should be one. However, this compensation technique can be utilized to compensate for variations in the high voltage resistor gain between 0.833 and 1.2. Outside of this range, the high voltage sensing resistors are assumed to be too degenerated to be reliable and should be replaced. The value of the high voltage resistor's gain derived by the calibration process can be displayed to the service technician as an indicator of the degree of resistor degradation and the need to replace the resistors.

The present invention provides a mechanism by which the signal that represents the sensed high voltage produced by the voltage multiplier can be adjusted to compensate for degradation of the voltage sensing resistors. The mechanism includes a calibration system to adjust the low voltage sensing circuit prior to determining the adjustment required to compensate for resistor degradation.

The invention being claimed is:

1. A system for sensing a voltage that exists across a pair of nodes in a high voltage supply for an X-ray tube, the system comprises:
   first and second resistors connected in series between the two nodes;
   a detector that produces a first signal which has a magnitude corresponding to a voltage across said second resistor;
   a variable gain circuit that changes the magnitude of the first signal by a gain factor to produce a second signal that indicates the voltage that exists across the two nodes; and
   a mechanism coupled to said variable gain circuit and which adjusts the gain factor to compensate for changes in resistance of said first and second resistors.

2. The system as recited in claim 1 further comprising:
   a circuit that applies a reference voltage to the detector during a calibration mode of the system;
   means for sensing a voltage level indicated by the second signal during the calibration mode; and
   a comparator that compares the voltage level indicated by the second signal to a value of the reference voltage, thereby determining whether said detector and said variable gain circuit are operating accurately.

3. The system as recited in claim 2 wherein said mechanism further adjusts the gain factor in response to said comparator to compensate for inaccuracy in said detector and said variable gain circuit.

4. The system as recited in claim 1 wherein said mechanism comprises a means for determining the resistor gain of said second resistor; and a means for deriving a new value for the gain factor in response to the resistor gain provided by said means for determining.

5. A system for sensing a voltage that exists across a pair of nodes in a high voltage supply for an X-ray tube, the system comprises:
   first and second resistors connected in series between the two nodes;
   a differential amplifier with a pair of inputs coupled to said second resistor and producing a first signal having a magnitude which corresponds to a voltage across said second resistor;
   a multiplying digital to analog converter connected to an output of said differential amplifier and which changes the magnitude of the first signal by a gain factor to produce a second signal that indicates the voltage that exists across the two nodes; and
   a gain adjust circuit including means for determining a resistor gain of said second resistor, a means for deriving a new value for the gain factor in response to the resistor gain; and a mechanism connected to said multiplying digital to analog converter for setting the gain factor to the new value.

6. The system as recited in claim 5 further comprising:
   a circuit that applies a reference voltage to said differential amplifier during a calibration mode of the system;
   means for sensing a voltage level indicated by the second signal during the calibration mode; and
   a comparator that compares the voltage level indicated by the second signal to a value of the reference voltage, thereby determining whether said differential amplifier and said multiplying digital to analog converter are operating accurately;
   wherein said gain adjust circuit responds to said comparator by setting the gain factor of said multiplying digital to analog converter to a new value which compensates for inaccuracy in said differential amplifier and said multiplying digital to analog converter.

7. A system for sensing a voltage that exists across a pair of output terminals of a high voltage supply for an X-ray tube wherein the high voltage supply has an anode voltage source and a cathode voltage source; the system comprises:
   first and second resistors connected in series between output terminals of said anode voltage source;
   third and fourth resistors connected in series between output terminals of said cathode voltage source;
   a first differential amplifier with a pair of inputs coupled to said second resistor, and producing a first signal having a magnitude which corresponds to a voltage across said second resistor;
   a first multiplying digital to analog converter connected to an output of said first differential amplifier, and changing the magnitude of the first signal by a first gain factor to produce a second signal that indicates a voltage level produced by the anode voltage source, wherein the second signal is coupled to the anode voltage source;

a second differential amplifier with a pair of inputs coupled to said fourth resistor, and producing a third signal having a magnitude which corresponds to a voltage across said fourth resistor;

a second multiplying digital to analog converter connected to an output of said second differential amplifier, and changing the magnitude of the third signal by a second gain factor to produce a fourth signal that indicates a voltage level produced by the cathode voltage source, wherein the fourth signal is coupled to the cathode voltage source; and a gain adjust circuit including a first mechanism that determines a first resistor gain of said second resistor and a second resistor gain for said fourth resistor, a second mechanism for deriving a first new value for the first gain factor in response to the first resistor gain and a second new value for the second gain factor in response to the second resistor gain and an adjustment mechanism connected to said first multiplying digital to analog converter for setting the first gain factor to the first new value and connected to said second multiplying digital to analog converter for setting the second gain factor to the second new value.

8. The system as recited in claim 7 further comprising:

a first circuit that applies a first reference voltage to said first differential amplifier during a calibration mode of the system;

a second circuit that applies a second reference voltage to said second differential amplifier during the calibration mode;

a switch connected to said first and second multiplying digital to analog converters, and having a first state in which the second signal is coupled to an output terminal of said switch and a second state in which the fourth signal is coupled to the output terminal;

a comparator connected to the output terminal of said switch to compare a value of the first reference voltage to a voltage level indicated by the second signal thereby determining whether said first differential amplifier and said first multiplying digital to analog converter are operating accurately, and to compare a value of the second reference voltage to a voltage level indicated by the fourth signal thereby determining whether said second differential amplifier and said second multiplying digital to analog converter are operating accurately;

wherein said gain adjust circuit responds to said comparator by setting the gain factors of said first and second multiplying digital to analog converters to new values which compensate for inaccuracies determined by said comparator.

* * * * *